Patented Sept. 11, 1951

2,567,315

UNITED STATES PATENT OFFICE 2,567,315

PROCESS FOR THE PRODUCTION OF A WATER REPELLING COMPOSITION AND THE COMPOSITION THEREOF

Auguste Florentin Bidaud, Serezin-du-Rhone, and Pierre Pascal Peyrot, Feyzin, France, assignors to Societe des Usines Chimiques Rhone-Poulenc, Paris, France, a corporation of France No Drawing. Application April 7, 1947, Serial No. 739,956. In France November 30, 1946

2 Claims. (Cl. 260—37)

The present invention relates to improvements in water-repelling organo-silicon products and is particularly concerned with products having the consistency of grease and having water-repelling properties.

In this specification and in the following claims the term organosilicic compound (oil, resin, etc.) means a compound in which the organic radicles are attached directly to the silicon atom and not through the intermediacy of another atom or group.

In accordance with the present invention, it has now been found that new and technically valuable products can be obtained by incorporating in an organo-silicic oil a water-repelling powder consisting of silicon dioxide obtained by the combustion of a silicon compound and rendered waterproof or water-repellent in any suitable manner by means of organo-silicon compounds.

By using such a waterproofed silicon dioxide, translucent, homogeneous pastes or greases are obtained which spread very readily in a thin layer even on glass and which, when containing a sufficient proportion of silicon dioxide, for example 15% by weight, have a high drip point, while their physical characteristics, such as consistency, are scarcely affected by temperature variations.

A further advantage of the use of waterproofed silicon dioxide is the fact that relatively small quantities are required in order to obtain a good water-repelling product. Thus, with proportions of less than 20% by weight, for example 10%, water-repelling greases are obtained which give high angles of contact with water. It is thus possible to obtain products of low consistency which will flow and penetrate into the smallest recesses which it is desired to line with water-repelling material, a highly desirable property for certain electrical applications.

It will be understood that the application of the water-proofed silicon dioxide according to the present invention is not limited to the preparation of greases of low consistency, because it is also possible to incorporate larger quantities thereof, for example two parts by weight to one of liquid, which gives thick, firm pastes.

Still further advantages flow from the use of such a water-proofed silicon dioxide. Thus, while silica gels prepared by the wet method and then waterproofed give good results, particularly with organosilicic oils of relatively high viscosity, for example of a viscosity higher than 1,000 centistokes, it is possible to employ with the silicon dioxide used according to the invention all types of organosilicic oils, from the most viscous to the least viscous, for example of 50 centistokes.

The organosilicic oils which it is proposed to incorporate with the waterproofed silicon dioxide according to the present invention must be understood to comprise organosilicic liquids which are insoluble in water and are non-volatile. Particularly indicated are siloxanes derived from dimethylchlorosilanes and especially those which do not distil below 200° C. to 300° C. in vacuo and which, as is known, have excellent dielectric properties.

Silicon dioxide as obtained by the combustion of a suitable silicon compound may be prepared in various ways, for example by the combustion of a mixture of silicon chloride and hydrogen. The product is in the form of a very light, fine, white powder weighing less than 50 grams per litre. However, the invention is not limited to silicon dioxide of low apparent density. Before or after the waterproofing, the oxide may be compressed in order to increase its apparent density, for example to 100 grams or more per litre.

The waterproofing may be effected in any suitable manner by means of organo-silicon compounds, for example in the known manner by means of methylchlorosilanes. In the latter case, the hydrochloric acid formed may be eliminated by means of a current of air, and the last traces removed more rapidly by washing (for example with ether), or neutralisation (with ammonia, amines or the like). The water-proofing may also be effected by treatment with a solution of organo-silicon resins with subsequent heating.

The incorporation in the organo-slicon liquids does not involve any difficulty and may be carried out by the usual known means. The appearance and the consistency of the products obtained depend, however, to a certain extent upon the means employed. Thorough mechanical working of the mixture (for example milling or malaxation) increases the homogeneity of the products.

The new greases obtained according to the present invention may be applied to the most varied materials, such as glass, ceramics, steatite, paper, cardboard, woven fabrics, metals and all substances and forms which it is desired to protect against the action of water or moisture. They may also be employed for protection against moisture or for preventing loss of water (waterproof papers). They are particularly valuable for the protection of parts or connections of electrical apparatus, joints, terminals, mastics and the like against moisture. They may be associated with other oils or greases, whether silicic or not.

The following non-limitative examples serve to illustrate the invention:

Example I

A quantity of silicon dioxide obtained by combustion and weighing about 37 grams per litre, is waterproofed by means of an organo-silicon compound, for example by treatment in the cold with a crude dimethylchlorosilane, and removing all traces of hydrochloric acid.

9 parts by weight of waterproofed silicon dioxide are mixed with 91 parts by weight of an organo-silicon oil. A fluid product is obtained, having a lesser consistency than petroleum jelly and better water-repelling properties.

Example II 20 parts of the waterproofed silicon dioxide employed in Example I are incorporated by malaxation with 80 parts of an organo-silicon oil, having a viscosity of 70 centistokes (methyl-siloxane). By prolonged malaxation, a grease resembling petroleum jelly is obtained. When spread on glass, it gives an angle of contact of over 100° with water. This grease can be used for coating parts of electrical equipment, such, for example, as ignition systems for motors, for the purpose of affording protection against moisture. Apart from these water-repelling properties, this grease has low combustibility and offers high resistance to arcing.

This new grease may be diluted with organic solvents for coating certain parts. It is to be noted that, when diluted with a large volume of ether, it forms an opalescent solution from which the incorporated mass of waterproofed silicon dioxide does not separate out.

Example III

In 1 part of organo-silicon oil are incorporated by malaxation 2 parts of silicon dioxide waterproofed by treatment with a solution of organo-silicon resin, with subsequent heating. A firm, translucent paste is obtained, which can be employed as a luting and as a medium for protecting mastics against moisture.

We claim:

1. A process for the production of improved water-repelling compositions in the form of greases and pastes which comprises waterproofing powdered silicon dioxide, prepared by the combustion of a silicon compound, by impregnating the particles of the silicon dioxide with a resinified methylchlorosilane, and thereafter admixing in the cold a water-insoluble, non-volatile liquid methyl polysiloxane derived from a dimethyl dichlorosilane with from 10% to 66% by weight of the mixture of the waterproofed silicon dioxide.

2. An improved water-repelling homogeneous composition having a pasty consistency and prepared by the method of claim 1.

AUGUSTE FLORENTIN BIDAUD.
PIERRE PASCAL PEYROT.

REFERENCES CITED

The following references are of record in the file of this patent:

UNITED STATES PATENTS

| Number | Name | Date |
| --- | --- | --- |
| 1,928,021 | King | Sept. 26, 1933 |
| 2,258,218 | Rochow | Oct. 7, 1941 |
| 2,306,222 | Patnode | Dec. 22, 1942 |
| 2,428,608 | Bass | Oct. 7, 1947 |
| 2,460,795 | Warrick | Feb. 1, 1949 |